Dec. 2, 1969  W. W. MUENCH  3,481,293

METHOD FOR MANUFACTURING WHEEL COVERS

Original Filed March 30, 1962  3 Sheets-Sheet 1

INVENTOR.
WALTER W. MUENCH
BY
ATTORNEYS

Dec. 2, 1969 W. W. MUENCH 3,481,293
METHOD FOR MANUFACTURING WHEEL COVERS
Original Filed March 30, 1962 3 Sheets-Sheet 3
FIG. 3
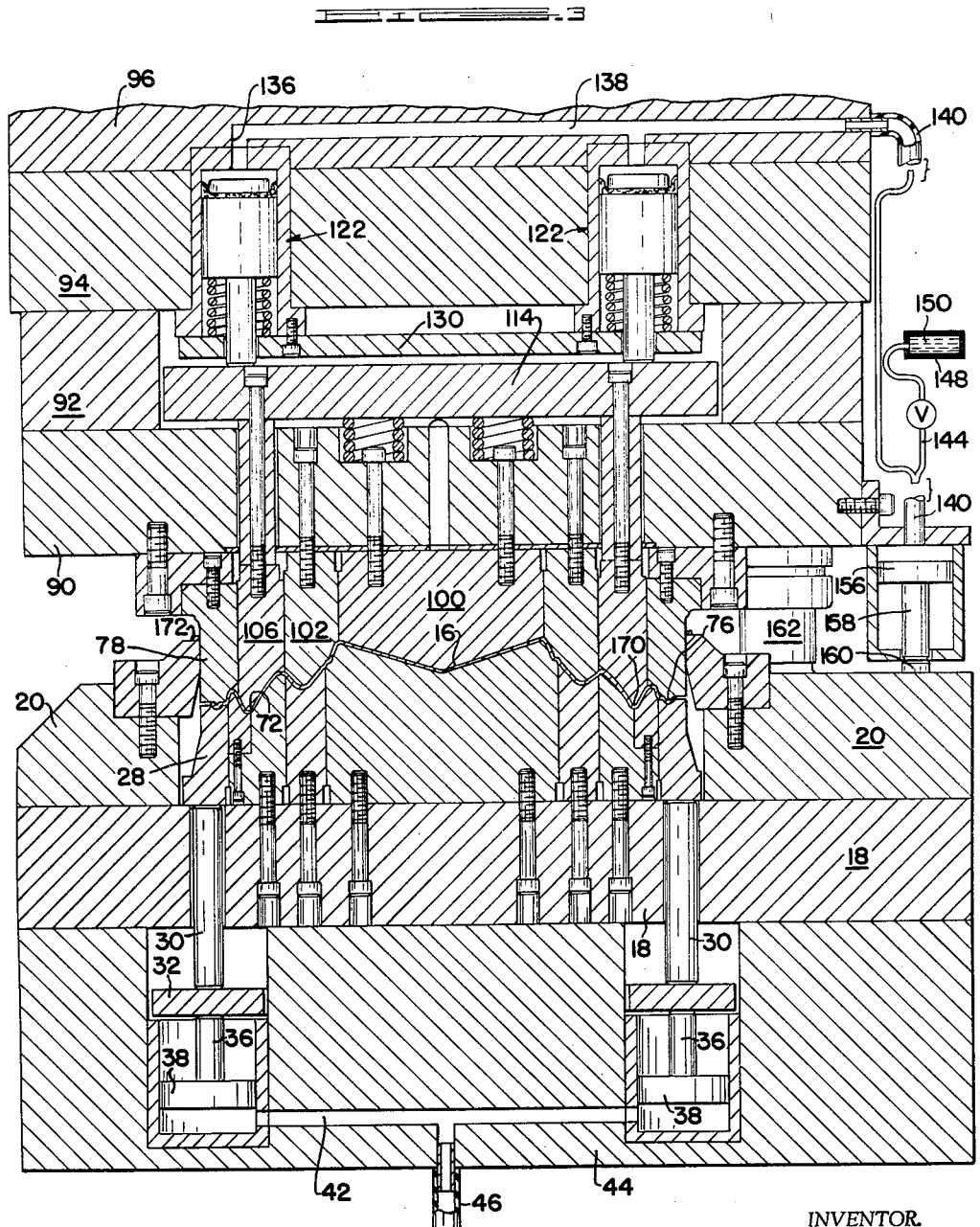
INVENTOR.
WALTER W. MUENCH
BY
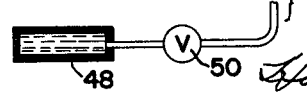
ATTORNEYS

United States Patent Office 3,481,293
Patented Dec. 2, 1969

3,481,293
METHOD FOR MANUFACTURING WHEEL COVERS
Walter W. Muench, Adrian, Mich., assignor, by mesne assignments, to North American Rockwell Corporation, a corporation of Delaware
Original application Mar. 30, 1962, Ser. No. 183,962, now Patent No. 3,252,315. Divided and this application Aug. 11, 1965, Ser. No. 478,831
Int. Cl. B21d 51/00; B21h 1/10
U.S. Cl. 113—116                    4 Claims

ABSTRACT OF THE DISCLOSURE

A method of forming a circular wheel cover in a die press apparatus when the wheel cover has a groove adjacent the periphery which is formed deeper than the periphery, the method utilizing a single stroke of the die press. The press apparatus has a lower die assembly and an upper die assembly which has a portion movable relative to the remainder of the upper die assembly. The method consisting of inserting a metal blank between the lower and upper die assemblies, moving the upper die assembly relative to the lower die assembly to grip the metal blank adjacent its outer edges, moving the upper die assembly further relative to the lower die assembly to deform the central portions of the metal blank into a desired shape and concurrently with the deformation of the central portions moving the portion of the upper die assembly which is movable relative to the remainder of the upper die assembly to form the deep groove adjacent the outer edge. The portion of the upper die assembly which is movable relative to the remainder of the upper die assembly is actuated by a fluid pressure system responsive to the movement of the remainder of the upper die assembly.

---

Figure 1:
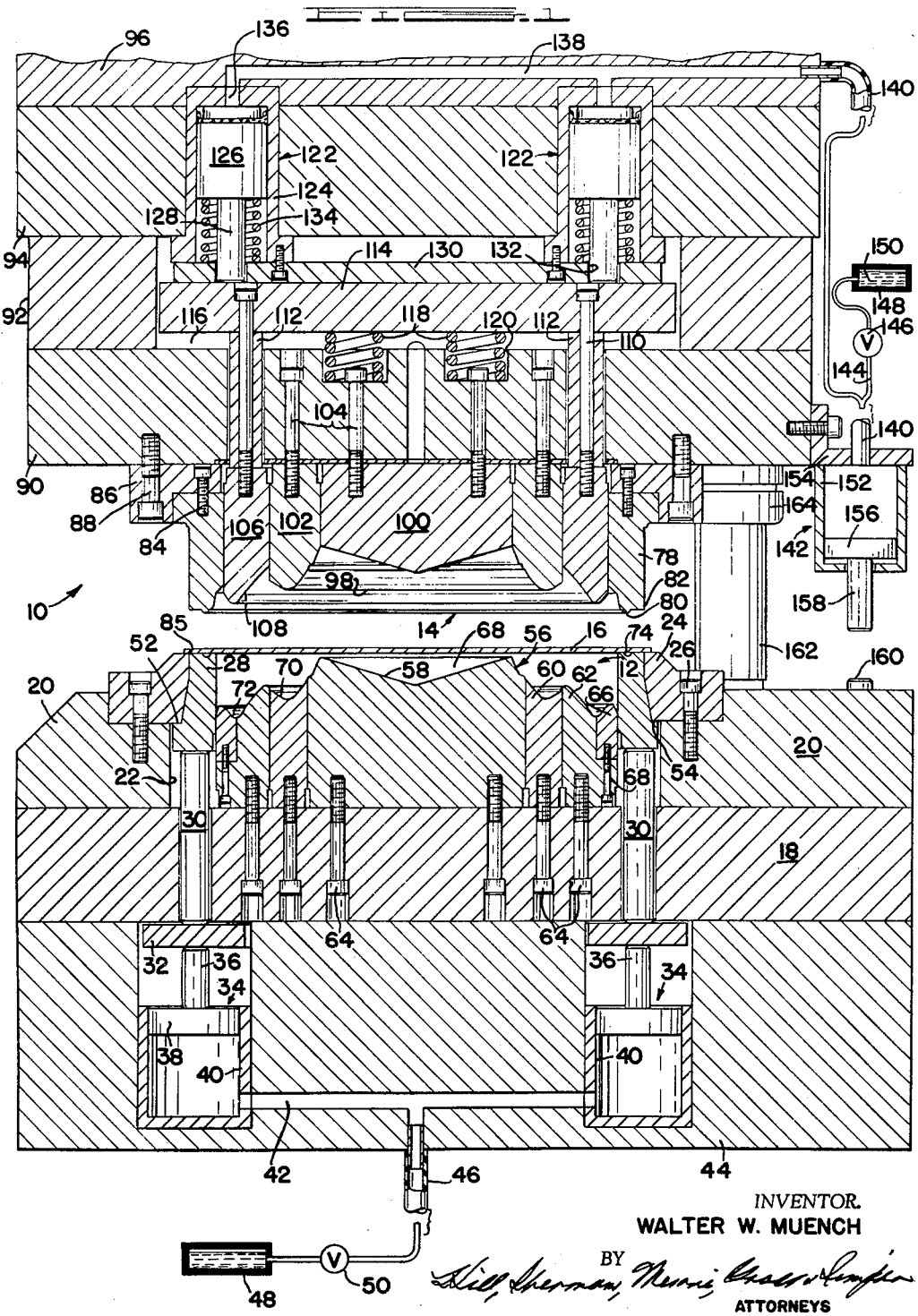

The present application is a division of my copending application entitled "Method and Apparatus for Manufacturing Wheel Covers," Ser. No. 183,962, filed Mar. 30, 1962, now U.S. Patent No. 3,252,315.

This invention relates generally to wheel covers and more particularly to an improved method for manufacturing wheel covers.

In the manufacture of a wheel cover having dished or grooved external surfaces, a sheet metal blank is positioned between spaced upper and lower die assemblies, following which the dies are moved toward each other in a press so as to deform and shape the blank therebetween. In some wheel covers, a deep groove is desirable in the portion of the cover adjacent the peripheral edge of the cover. In the event this groove is of a depth such that it extends to a depth below the peripheral edge of the cover, special problems are encountered in the manufacture of the cover. More specifically, during the shaping of the blank to form the cover, a peripheral edge portion of the blank is gripped in the die assembly so as to form a "draw bead" in the peripheral edge portion of the cover. In the event the groove adjacent the draw bead is of a depth such that it extends below the draw bead, the upper die must be of a shape such that an annular groove forming projection on the upper die assembly will extend below the draw bead when the cover has the upper die must be of a shape such that an annular projection in the upper die assembly which forms the deep groove extends below the portion of the upper die assembly which forms the draw bead, the annular projection will engage the sheet metal blank prior to engagement of the blank by the draw bead forming portion of the upper die assembly. It has been found that when the blank is first engaged inwardly of the draw bead, the blank will wrinkle to an extent such that an acceptable wheel cover cannot be formed.

Consequently, it is necessary to provide the upper die assembly with an annular section which is movable downwardly a distance sufficient to form the desired deep groove in the wheel cover, but which is maintained in a retracted position relative to the draw bead forming portion of the upper die assembly until the sheet metal blank has been securely gripped by the draw bead forming portions of the upper and lower die assemblies. Presses can be constructed so that they will provide for a relative movement of different sections of an upper die assembly. However, presses of this type are more expensive than a press of a type which merely provides for relative vertical movement of the upper and lower die assemblies. It is an object of this invention, therefore, to provide an improved method of forming a wheel cover with the desired deep groove which can be used with a simple press of the type described above.

A further object of this invention is to provide a die assembly in which the upper die assembly includes an annular section which is movable downwardly by a hydraulically actuated mechanism which operates in response to movement of the upper and lower die assemblies toward each other, following engagement of the blank by the draw bead forming portions of the die assemblies, so as to move the annular section downwardly to a groove forming position.

A further object of this invention is to provide a hydraulic die actuating assembly which is readily incorporated in a wheel cover forming die assembly.

Figure 2:
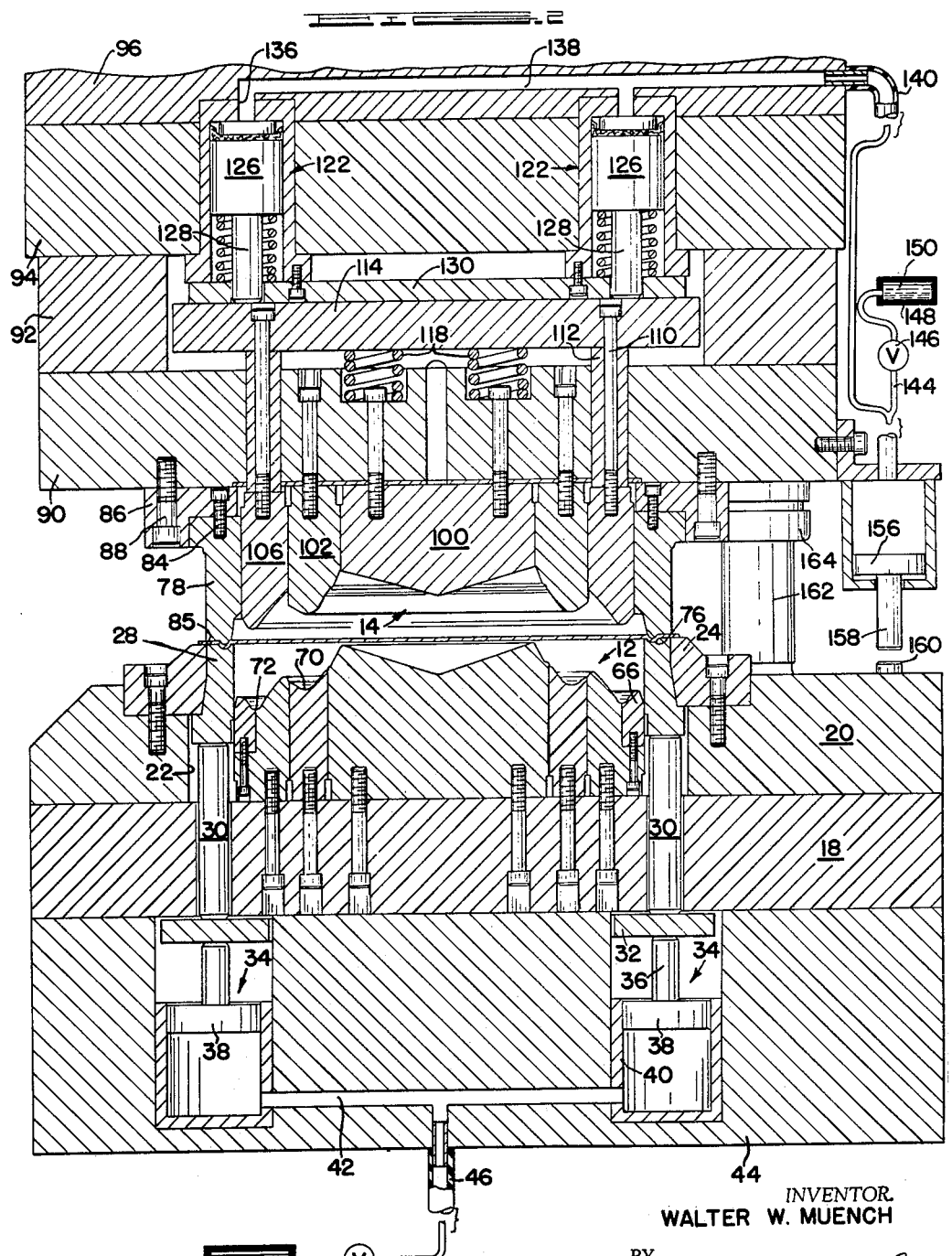

Further objects, features and advantages of this invention will become apparent from a consideration of the following description, the appended claims, and the accompanying drawings in which:

FIGURE 1 is a vertical sectional view of the apparatus of this invention, showing the hydraulic actuating apparatus in diametric form in assembly therewith, and showing the upper die assembly in a raised position relative to the lower die assembly;

FIGURE 2 is a vertical sectional view, illustrated similarly to FIGURE 1, showing the upper die assembly moved downwardly relative to the lower die assembly a distance sufficient to grip a sheet metal blank positioned therebetween; and FIGURE 3 is a vertical sectional view, illustrated similarly to FIGURES 1 and 2, showing the upper die assembly in its final downwardly moved blank forming position.

With reference to the drawings, the die apparatus of this invention, indicated generally at 10, is shown in FIGURES 1, 2 and 3 as including a lower die assembly 12 and an upper die assembly 14 which is movable from an upper position spaced above the lower die assembly (FIGURE 1) to a lower position in which it has its lower end nested within the lower die assembly (FIGURE 3). In FIGURE 1, a sheet metal blank 16 is shown supported on the lower die assembly 12. The blank 16 forms a part of a roll of sheet metal which is continuously fed between the lower and upper die assemblies and a section of which is cut off each time the upper die assembly 14 is moved to its FIGURE 3 position in which the blank 16 is in the shape desired for a wheel cover.

The lower die assembly 12 is supported on a base member 18 which also supports a body member or shoe 20 which has an opening 22 extended therethrough. The lower die assembly 12 is supported on the base 18 and is positioned in the opening 22. A stationary ring shape cutter member 24 is secured by bolts 26 to the top side of the body member 20 at a position extending about and slightly above the lower die assembly 12. An annular draw bead forming or blank margin clamping section 28 of the lower die assembly 12 is supported on a plurality of pins 30, only two of which are shown, which extend through the base 18 and are supported at their lower ends on a ring 32. A plurality of hydraulic cylinder assemblies 34, only two of which are shown, have piston rods 36 which support the ring 32. In each assembly 34, the piston rod 36 is secured to the top side of a piston 38 which is slidably supported in a cylinder 40. Fluid is supplied to the cylinders 40, on the bottom sides of the pistons 38, through a passage 42 in a mounting plate 44 for the assemblies 34. The passage 42 communicates through a line 46 with a tank 48, and a valve 50 is positioned in the line 46.

The fluid pressure in the cylinders 40 is sufficient to move the ring 32 to its upper position in which it moves the pins 30 to upper limit positions in which an annular shoulder 52 on the lower die section 28 engages the lower end 54 of the cutter member 24. In this position of the die section 28, the sheet metal blank 16, which is somewhat wider than the diameter of the die section 28 is supportable on the die section 28 and projects outwardly onto the top end of the cutter member 24.

The lower die assembly 12 also includes an inner section 56 which is disposed radially inwardly of the draw bead forming section 28. The section 56 consists of a central member 58, two intermediate members 60 and 62, all of which are secured to the base 18 by bolts 64, and a smaller member 66 which is secured by bolts 68 to the section 62. The inner section 56 of the lower die assembly 12 is formed on its upper surface to the desired final shape of the wheel cover which is to be formed in the apparatus 10. Accordingly, the inner section 56 has a central cavity 68 which is surrounded by grooves 70 and 72. As shown in FIGURE 3, when the blank 16 is formed to its final shape, the groove 72 in the lower die assembly 12 is of a depth such that it extends below the upper end of the draw bead forming section 28, which is formed with a groove 74 shaped to form a draw bead 76 in the blank 16.

The upper die assembly 14 includes an outer draw bead forming or blank margin clamping section 78 which has an annular projection 80 on its lower end vertically aligned with and shaped to nest in the groove 74 in the lower draw bead forming section 28. The outer edge 82 of the upper die section 78 is of a size to telescope within the cutter member 24 so that on downward movement of the upper die section 78 the edge 82 cooperates with the edge 85 of the cutter member 24 to cut a circular piece of metal from the blank 16. The upper die section 78 is secured by bolts 84 to a supporting ring 86 which is secured by bolts 88 to an upper plate 90. The plate 90 is in turn secured by a ring 92 to a plate 94 which is secured to a block 96 which in turn is mounted on the vertically movable portion of a press on which the mounting plate 44 on the base 18 is supported in a fixed position.

The upper die assembly 14 also includes an inner section 98 which consists of a central die member 100 and a ring 102 which surrounds the member 100. Both the members 100 and 102 are secured to the plate 90 by bolts 104. Positioned between the inner section 98 of the upper die assembly 14 and the outer section 78 is an intermediate upper die member 106 which is of ring shape and which has its lower end 108 shaped to nest in the groove 72 in the lower die assembly 12. As will be more fully explained hereinafter, the intermediate annular die section or member 106 is movable vertically relative to the outer die section 78 and the inner die section 98 both of which are fixed on the vertically movable plate 90.

The die member 106 is secured, by bolts 110 and spacer sleeves 112 to an actuating plate 114 which is disposed in a space 116 within the ring 92 and between the supporting plate 90 and the plate 94. A plurality of springs 118, only two of which are shown, are positioned in cavities 120 in the top side of the supporting plate 90 and engage the bottom side of the actuating plate 114 so as to continuously urge the actuating plate 114 in an upward direction to thereby urge the die member 106 upwardly toward its upper position shown in FIGURE 1.

Fluid motor means comprising a plurality of hydraulic cylinder assemblies 122 are mounted on the plate 94 so that they project downwardly toward the actuating plate 114. Each assembly 122 includes a cylinder 124 mounted in a fixed position on the plate 94, a piston 126 which is mounted for reciprocal movement in the cylinder 124, and a downwardly projecting piston rod 128 which engages the top side of the actuating plate 114. The lower ends of the cylinders 124 are closed by a plate 130 which has openings 132 therein of a size such that the piston rods 128 can extend downwardly therethrough. A spring 134 is mounted in each of the cylinders 124 at a position surrounding the piston rod 128 so that it extends between the top side of the plate 130 and the bottom side of the piston 126. The upper end of each of the cylinders 124 is formed with a fluid passage 136 which communicates with a passage 138 in the block 96. The passage 138 is connected to one end of a conduit 140, the opposite end of which is connected to a hydraulic cylinder assembly 142. Intermediate its ends the conduit 140 is connected to a conduit 144 which has a pressure control valve 146 disposed therein. The conduit 144 is connected to a fluid reservoir 148 which has fluid 150 under pressure therein.

The hydraulic cylinder assembly 142 includes a cylinder 152 which is mounted on a bracket 154 secured to the plate 90. The piston 156 is slidably mounted in the cylinder 152 for up and down reciprocal movement and carries a downwardly extending piston rod 158 which is vertically aligned with an actuating pin 160 mounted on the top side of the shoe 20. During downward movement of the upper die assembly 14 toward the lower die assembly 12, the piston rod 158 engages the pin 160 and the piston 156 is moved upwardly in the cylinder 152 so as to force fluid through the conduit 140 and the passage 138 into the cylinder assemblies 122 so as to move the piston rods 128 downwardly to in turn move the actuating plate 114 and the die member 106 downwardly.

In the operation of the apparatus 10, assume that the lower and upper die assemblies 12 and 14, respectively, are in the positions shown in FIGURE 1 and that the sheet metal blank 16 is supported on the upper end of the draw bead forming section 28 of the lower die assembly 12. The press in which the apparatus 10 is mounted is operated to move the upper die assembly 14 downwardly toward the lower die assembly 12. During such movement, the upper die assembly 14 is guided by upright guide pins 162 on the lower shoe 20 which telescope into bushings 164 carried by the plate 90. Only one pin 162 and bushing 164 are illustrated, but it is to be understood that a plurality of these members are utilized.

When the upper die assembly 14 has been moved downwardly to a position in which the upper draw bead forming die section 78 engages the blank 16 and forms the draw bead 76 therein, the parts of the apparatus 10 are in the positions illustrated in FIGURE 2. As shown in FIGURE 2, the piston rod 158 is spaced above the pin 160 so that at this time no fluid has been pumped from the cylinder assembly 142 into the cylinder assemblies 122 so as to move the die member 106 downwardly from its upper position shown in FIGURES 1 and 2. Consequently, at this time, the die member 106 is in a position in which the lower end thereof is positioned above the lower end of the draw bead forming die section 78. The sheet metal blank 16 is thus securely gripped between the die sections 28 and 78 of the blank by the die member 106.

During subsequent downward movement of the upper die assembly 14, the lower draw bead forming die section 28 is moved downwardly against the pressure of the fluid in the cylinders 40 which provides a yieldable support for the die section 28, and the blank 16 is cut to a circular shape by movement of the die section edge 82 through the cutter member edge 85. A small amount of waste metal 172 remains on the cutter member 24. Fluid is forced out of the cylinders 40 through the passage 42 and the conduit 46 into the reservoir 48 with the pressure valve 50 functioning to maintain a predetermined pressure in the cylinders 40. Also, during further downward movement of the upper die assembly 14, the piston rod 158 engages the pin 160 so as to move the piston 156 upwardly in the cylinder 152 to thereby force fluid out of the cylinder 152 into the upper ends of the cylinder assemblies 122. This fluid moves the pistons 126 downwardly so as to move the piston rods 128 downwardly to in turn move the die member 106 downwardly to the position shown in FIGURE 3 in which the lower end of the die member 106 projects below the lower end of the die section 78. It is not critical when the relative movement of the die member 106 and the die sections 78 and 98 occurs so long as it follows the engagement of the die section 78 with the blank 16 so as to securely grip the blank at its periphery.

In its lower position (FIGURE 3), the lower edge of the die member 106 nests within the groove 72 so as to form the blank 16 with a deep groove 170 which is located adjacent the draw bead 76. Any fluid which is forced out of the cylinder 152 which is in excess of that necessary to move the hydraulic cylinder assemblies 122 downwardly to the positions shown in FIGURE 3 flows through the conduit 144 and the valve 146 into the reservoir 150. In this connection, it is to be understood that while a single cylinder assembly 142 has been illustrated for actuating the cylinder assemblies 122, a plurality may be provided if desired. The lower draw bead forming die section 28 has been moved downwardly to the stop position shown in FIGURE 3, in which it engages the base 18 and the blank 16 has been shaped to its final desired form. The press is then actuated to lift the supporting plate 90 to its position shown in FIGURE 1. As soon as the upper bead forming die section 78 is moved upwardly the pressure of the fluid in the reservoir 48 provides for an upward movement of the pistons 38 so as to raise the die section 28 to its upper position shown in FIGURE 1 in which the shoulder 52 on the die section 28 engages the lower end 54 of the cutter member 24. The shaped blank 16 is removed from the apparatus 10 and another blank 16 is fed into the position shown in FIGURE 1. As soon as the piston rod 158 commences its upward movement relative to the pin 160, the fluid pressure in the cylinders 124 drops so that the forces exerted on the lower ends of the piston rods 128 by the springs 120 is sufficient to raise the pistons 126 upwardly in the cylinders 124 to thereby raise the die member 106 to its upper position shown in FIGURE 1 so that the apparatus 10 is in position for forming the next blank 16 to the shape shown in FIGURE 3.

From the above description it is seen that this invention provides a method whereby a deep groove 170 can be formed in the blank 16 which is adjacent to and extends below the draw bead 76. The deep groove 170 is obtained without a requirement for a complex press. By virtue of the mounting of the upper die member 106 so that it is movable relative to the adjacent upper die sections between the upper and lower positions shown in FIGURES 1 and 3, respectively, and is fluid actuated so that it is moved downwardly following gripping of the blank between the die sections 28 and 78, the blank 16 can be formed without wrinkling.

It will be understood that the method for manufacturing wheel covers which is herein disclosed and described is presented for purposes of explanation and illustration and is not intended to indicate limits of the invention, the scope of which is defined by the following claims.

I claim as my invention:

1. The method of shaping a circular wheel cover from a sheet metal blank in die apparatus which includes a lower die assembly and an upper reciprocally movable die assembly having an annular portion reciprocally movable relative the remainder of said upper die assembly, said method comprising moving said upper die assembly toward the lower die assembly so as to grip said blank adjacent the outer edge thereof, thereafter moving said upper die assembly so as to deform a central portion of said blank to the desired shape actuating a fluid pressure system by movement of the said upper die assembly to create a fluid back pressure, using said fluid back pressure to move said annular portion relative to said remainder of said upper die assembly, and concurrently with said central portion deforming step relatively moving by said fluid back pressure said annular portion of said upper die assembly relative to the said remainder of said upper die assembly so as to form a deep groove in said blank adjacent the gripped outer edge thereof which extends below said outer edge.

2. The method of shaping a circular wheel cover from a flat sheet metal blank in die apparatus which includes a lower circular die assembly and an upper circular reciprocatably movable die assembly in which said die assemblies have opposed coactive circular groove shaping portions including a grooving ring member on said upper assembly which is movable downwardly relative to the remainder of the upper assembly, and a complementary grooving arrangement in the lower assembly for forming an annular groove in the blank adjacent to its outer edge, said method comprising: moving said upper die assembly toward the lower die assembly so as to grip said blank adjacent the outer edge thereof, thereafter moving said upper die assembly so as to deform a central portion of the said blank to the desired shape, actuating a fluid pressure system by movement of said upper die assembly to supply pressurized fluid, using said pressurized fluid to drive said ring member, concurrently with said step deforming said central portion of said blank, relatively moving said ring member toward the grooving arrangement to start said groove adjacent the outer edge of the blank, and as the final step moving said ring member by said pressurized fluid relative to said remainder of the upper assembly all the way into said grooving arrangement to complete the groove.

3. The method of shaping a circular wheel cover from a sheet metal blank in a die press apparatus by one stroke of the press so that said wheel cover has a deep groove therein adjacent the outer edge thereof where the apparatus has a lower lie portion and a reciprocatably movable upper die portion which has an annular ring portion reciprocatably movable relative to the remainder of said upper die portion which comprises: inserting a sheet metal blank between said upper and said lower die portions, moving said upper die portion relative to said lower die portion to grip said metal blank between said upper and said lower die portions adjacent the outer edge of said blank, thereafter moving said upper die portion to deform said blank in a central portion thereof radially in from the said outer edge, actuating a fluid pressure system by said movement of the upper die portion to create a fluid back pressure, using said fluid back pressure to move said annular ring portion relative to said remainder of said upper die portion, and concurrently with the step which deforms the blank in the said central portion moving said annular ring portion relative to said remainder of said upper die portion by said fluid back pressure to form a deep groove in said blank adjacent the outer edge thereof.

4. The method of shaping a circular wheel cover having a deep groove therein adjacent the outer edge thereof from a sheet metal blank in a die press apparatus by one stroke of the press, the apparatus having a lower die assembly and a movable upper die assembly which has an annular ring portion adjacent the outed edge thereof which is reciprocally movable relative to the remainder of said upper die assembly, the method comprising moving said upper die assembly toward the lower die assembly to initially grip said blank outwardly of said annular ring portion between the peripheral portions of said die assemblies, thereafter continuing to move said upper die assembly to deform a central portion of said blank to the desired shape and concurrently with said central portion deforming step utilizing said continued movement of said upper die assembly to move said annular ring portion relative to the remainder of said upper die assembly so as to form the deep groove in said blank adjacent the gripped outer edge thereof which extends below said outer edge.

References Cited

UNITED STATES PATENTS 3,085,531  4/1963  Kowalski _____ 113—113
3,001,494  9/1961  Lyon _____ 113—116

RICHARD J. HERBST, Primary Examiner

U.S. Cl. X.R.

29—159.01

PO-1050
(5/69)

UNITED STATES PATENT OFFICE

CERTIFICATE OF CORRECTION

Patent No. 3,481,293          Dated December 2, 1969

Inventor(s) WALTER W. MUENCH

It is certified that error appears in the above-identified patent and that said Letters Patent are hereby corrected as shown below:

Column 1, line 64, after "has" insert -- been fully formed. However, in the event the --.

Column 1, line 65, delete "the upper die must be of a shape such that an".

Column 6, line 51, change "lie" to -- die --.

Column 7, line 1, change "outed" to -- outer --.

SIGNED AND
SEALED
SEP 22 1970

(SEAL)
Attest:

Edward M. Fletcher, Jr.
Attesting Officer

WILLIAM E. SCHUYLER, JR.
Commissioner of Patents